United States Patent Office 3,826,771
Patented July 30, 1974

3,826,771
STABLE HIGH SOLIDS WATER-IN-OIL EMULSIONS OF WATER SOLUBLE POLYMERS
Donald R. Anderson, Oswego, and Alvin J. Frisque, La Grange, Ill., assignors to Nalco Chemical Company, Chicago, Ill.
No Drawing. Continuation-in-part of application Ser. No. 320,012, Jan. 11, 1973, which is a continuation-in-part of application Ser. No. 161,967, July 12, 1971, now abandoned. This application Nov. 6, 1973, Ser. No. 413,405
Int. Cl. C08f 1/13
U.S. Cl. 260—29.6 H 14 Claims

ABSTRACT OF THE DISCLOSURE

A water-in-oil emulsion which has a water-soluble vinyl addition polymer concentration between 20 and 50% by weight based on emulsion which exhibits unusual stability properties.

This is a continuation-in-part application of application Ser. No. 320,012 filed Jan. 11, 1973, which is a continuation-in-part of application Ser. No. 161,967 filed July 12, 1971 both now abandoned.

INTRODUCTION

This invention concerns a water-in-oil polymer and copolymer emulsion having a polymer concentration between 20 and 50% by weight based on emulsion exhibiting unusual stability properties.

Various synthetic and naturally-occurring water-soluble polymers have been developed which exhibit, in aqueous solution, superior thickening and flocculating properties. These polymers are being used increasingly in a number of commercial applications such as, for example, in the clarification of aqueous systems, in paper-making operations, in the treatment of sewage and industrial waste, as stabilizers for drilling muds, and in the secondary recovery of petroleum water flooding.

Although these polymers are most often available commercially as powders or as finely-divided solids, they are most frequently utilized as aqueous solutions. This necessitates that the solid polymer material be dissolved in water. This is a time consuming step as well as one which has serious drawbacks with respect to the actual dispersion of solids into the aqueous media.

The products made under the process described and claimed in U.S. Pat. 3,284,393, Vanderhoff, illustrate a water-in-oil emulsion polymerization method for the production of dry solid polymers. The Vanderhoff method broadly describes a monomer phase range between 30 and 70% by weight of the emulsion. Monomer phase is defined therein as monomer plus water. However, in his illustrative examples, only two of the examples had a monomer phase greater than 30%. Shown below in Table I are the monomer phase concentrations in U.S. 3,248,393.

TABLE I

Monomer Phase Concentrations in U.S. 3,248,393

| Example: | Monomer Phase Percent |
|---|---|
| 1 | 28.03 |
| 2 | 28.00 |
| 3 | 28.00 |
| 4 | 28.03 |
| 5 | 30.65 |
| 6 | 28.02 |
| 7 | 28.02 |
| 8 | 28.02 |
| 9 | 28.00 |
| 10 | 33.91 |
| 11 | 28.02 |
| 12 | 28.01 |
| 13 | 29.71 |
| 14 | 28.01 |
| 15 | 29.48 |
| 16 | 28.02 |
| 17 | 28.76 |
| 18 | 26.64 |
| 19 | 9.16 |
| 20 | 22.53 |

It should be noted that the high monomer phase concentration is 33.91%, with the majority of the examples being within the range 22.5 to 29.0%. In addition, the products manufactured via the Vanderhoff technique are unstable and drop out of the emulsion within a short period of time. It is clear that these extremely low values for the monomer and water do not achieve the minimum 30% monomer phase alleged by Vanderhoff. Thus, it can be readily seen that this art is practiced for the most part below the claimed ranges.

U.S. 3,041,318, Hess, teaches a process for recovering water-soluble polymers. Disclosed therein is a method for preparing emulsions containing polymers. This method involves the addition of an oil-emulsifier phase to an aqueous solution of a water-soluble polymer. Such emulsions containing 20 to 50% by weight of vinyl addition polymers having molecular weights in excess of 1,000,000 cannot be prepared via the technique used in Hess for the reason that it is not possible to prepare aqueous solutions containing high enough concentrations of the polymer. For example, to prepare 100 grams of an emulsion containing approximately ⅓ water, ⅓ hydrophobic liquid and ⅓ polymer, it would be necessary to dissolve 33⅓ grams of the high molecular weight polymer in 33⅓ grams of water. It simply is not possible to prepare this 50% aqueous solution of polymer. To exemplify the above discussion, several polymers are shown below in Table II with their solution characteristics noted.

TABLE II

| Test No. | Polymer composition | Molecular weight (approximate) | Aqueous solution concentration, percent | Remarks |
|---|---|---|---|---|
| 1 | 50% Na acrylate, 50% acrylamide | 11,000,000 | 10.0 | Intrinsic viscosity=21.3; rubberlike features. |
| 2 | 25% DMAEM,[1] 75% acrylamide | 5,700,000 | 10.0 | Intrinsic viscosity=10.5; rubberlike. |
| 3 | Na polystyrene sulfonate | 6,800,000 | 3.8 | Rubbery or gel like. |
| 4 | Na polyacrylate | 8,000,000 | 3.1 | Do. |

[1] DMAEM=dimethylaminoethyl methacrylate.

Upon preparation of the examples as shown in Table II, attempts were made to prepare emulsions by the addition of a hydrophobic liquid and emulsifier. It was not possible to do so even with the addition of excessive amounts of inert hydrophobic liquid and emulsifier.

The present invention claims a water-in-oil polymer containing emulsion having an aqueous phase ranging between 75 and 95% by weight of the emulsion. The aqueous phase is comprised of from 20 to 50% by weight of the emulsion of a water-soluble vinyl addition polymer having a molecular weight of at least 1,000,000 and from 45 to 55% by weight of the emulsion of water. In addition, the present invention claims an inert hydrophobic liquid in a concentration of 5 to 25% by weight of the emulsion.

The aqueous phase of the present invention is the same as the monomer phase as described in Vanderhoff, that is, it is the sum of the vinyl addition polymer and water in the composition. In the present invention a typical vinyl addition polymer concentration is 30%. A typical water concentration is 45% by weight of the emulsion. Thus, the total aqueous phase is outside that illustrated in Vanderhoff, as well as being substantially greater than the range practiced in Vanderhoff.

The present invention exhibits a stable emulsion composition. The stability is one of the key factors of this invention. The stability exhibited by the composition is defined as the ability to maintain the dispersion of the polymer particles throughout the emulsion for a period of at least three weeks at which time the dispersion can be reformed with only slight agitation. The stability exhibited by the composition of the present invention is completely unexpected. The product made under Vanderhoff, U.S. Patent 3,284,393 does not exhibit the stability properties of this invention. Upon standing for a similar three-week period the product disintegrates and is non-redispersible with vigorous agitation. Thus, the increased water-to-oil ratio in the present invention gives the increased stability to the emulsion product.

OBJECTS

An object of this invention is to provide an emulsion composition.

Another object of this invention is to provide an emulsion composition which has a high degree of stability.

Another object of this invention is to provide an emulsion composition which has a polymer content between 20 and 50% by weight based on emulsion.

Another object of this invention is to provide an emulsion composition which has an aqueous phase of at least 75% based on the emulsion.

THE INVENTION

This invention is directed to a stable water-in-oil polymer emulsion which contains dispersed therein finely-divided particles of water-soluble vinyl addition polymer in the concentration of at least 20% based on emulsion. This can be termed a polymer-containing emulsion.

From a commercial standpoint it is beneficial that the polymer emulsions thus described be stable, yet at the same time contain relatively large amounts of polymer. One method of assuring that the polymers do not precipitate when dispersed in the emulsion is that the particle size of the polymer be as small as possible. Thus, polymers dispersed in the emulsion are quite stable when the particle size is within the range of 2 millimicrons up to about 5 microns. The preferred particle size is within the range of 5 millimicrons and 3 microns.

The stable water-in-oil emulsion comprises:

(1) an aqueous phase;
(2) an inert hydrophobic liquid; and
(3) a water-in-oil emulsifying agent.

The primary feature of this polymer-containing emulsion is that it remains stable with passage of time. The stability which this composition exhibits as defined above is the maintenance of the dispersion of the polymer particles throughout the emulsion for a period of at least three weeks at which time the dispersion can be reformed with only slight agitation.

The polymer-containing emulsion of this invention is comprised in an aqueous phase ranging between 75 and 95% by weight of the emulsion. The aqueous phase is defined as a sum of polymer or copolymer and the water present in the composition. The preferred range is between 75 and 90% by weight of the emulsion. The most preferred range is between 75 and 80% by weight of the emulsion.

The present invention has a polymer concentration between 20 and 50% by weight of the emulsion. A preferred range is between 25 and 40% by weight of the emulsion. The most preferred range is between 30 and 35% by weight of the emulsion.

The polymers most commonly used in many industrial applications are acrylamide polymers which include polyacrylamide and its water soluble copolymeric derivatives such as, for instance, acrylic acid, methacrylic acid and acrylonitrile. The copolymers contain from about 5 to 95% by weight of acrylamide.

Other water-soluble vinyl polymers are described in detail in the following U.S. Pats.: 3,418,237; 3,259,570 and 3,171,805 which are incorporated herein by reference. In examining the disclosures of these patents it will be seen that the water-soluble polymers may be either cationic or anionic and, in some instances, the ionic charges are sufficiently slight so that the polymers may be considered nonionic. For example, water-soluble polymers and copolymers of allyl, diallyl amines or dimethylaminoethylmethacrylate are cationic. Polymers such as polyacrylamide are nonionic and polymers such as polyacrylic acid or polystyrene sulfonates are anionic.

The molecular weight of the polymers described above may vary over a wide range, e.g. 10,000 to 25,000,000. The preferred polymer has a molecular weight in excess of 1,000,000.

The organic or oil phase is comprised of an inert hydrophobic liquid. The hydrophobic liquid comprises between 5 and 25% by weight of the emulsion. The preferred range is between 10 and 25% by weight of the emulsion. The most preferred range is between 20 and 25% by weight of the emulsion.

The oils used in preparing these emulsions may be selected from a large group of organic liquids which include liquid hydrocarbons and substituted liquid hydrocarbons. Preferred group of organic liquids are hydrocarbon liquids, most preferably aliphatic hydrocarbon liquids, which include blends of aromatic and aliphatic hydrocarbon compounds which contain from 4 to 8 carbon atoms. Thus, such organic hydrocarbon liquids as benzene, xylene, toluene, mineral oils, kerosenes, naphthas, and in certain instances, petroleums may be used. A particularly useful oil from the standpoint of its physical and chemical properties is the branch-chain isoparaffinic solvent sold by Humble Oil and Refinery Company under the tradename "ISOPAR M." Typical specifications of this narrow-cut isoparaffinic solvent are set forth below in Table III.

TABLE III

| Specification properties | Minimum | Maximum | Test method |
| --- | --- | --- | --- |
| Gravity, °API at 60/60° F | 48.0 | 51.0 | ASTM D 287 |
| Color, Saybolt | 30 | | ASTM D 156 |
| Aniline point, ° F | 185 | | ASTM D 611 |
| Sulfur, p.p.m | | 10 | ASTM D 1266 [1] |
| Distillation, ° F.: | | | |
| IBP | 400 | 410 | ASTM D 86 |
| Dry point | | 495 | ASTM D 86 |
| Flash point, ° F.[2] | 160 | | ASTM D 93 |

[1] Nephelometric mod.
[2] Pensky-Martens closed cup.

Any conventional water-in-oil emulsifying agent can be used such as sorbitan monostearate, sorbitan monooleate, and the so-called low HLB materials which are all documented in the literature and are summarized in the Atlas HLB Surfactant Selector. Although the mentioned emulsifiers are used in producing good water-in-oil emulsions, other surfactants may be used as long as they are capable of producing these emulsions. These surfactants or emulsifying agents are added to the basic aqueous phase plus oil phase. The water-in-oil emulsifying agent is added in amounts ranging between 0.1 and 15% by weight of the emulsion and is disposed between the two basic phases. The preferred range is between 1.0 and 15% by weight of the emulsion. The most preferred range is between 2 and 10% by weight of the emulsion.

The stable water-in-oil emulsion of the present invention exhibits the unique ability of rapidly dissolving into aqueous solution. The polymer-containing emulsion releases the polymer in water in the presence of a surfactant in a very short period of time when compared to the amount of time required to dissolve a solid form of the polymer. This inversion technique is described in U.S. Patent 3,624,019, Anderson et al.

The water-in-oil polymer containing emulsions of this invention are prepared by the techniques used in U.S. 3,284,393, Vanderhoff, which is incorporated herein by reference. Basically, the emulsions are prepared by:

A. Using as a reaction mixture:
  (1) water which contains dissolved therein a water-soluble vinyl addition monomer thereby producing a monomer phase, having a concentration of from 75 to 95% by weight of the emulsion;
  (2) an inert hydrophobic liquid ranging between 5 and 25% by weight of the emulsion;
  (3) water-in-oil emulsifying agent in a concentration of 0.1 to 15%; and
  (4) a free radical initiator whereby a water-in-oil emulsion is formed; and B. Heating the emulsion under free radical conditions to polymerize the water-soluble vinyl addition monomer containing emulsion thereby producing a stable water-in-oil emulsion which contains dispersed therein finely-divided particles of a water-soluble vinyl addition polymer.

The following examples show ways in which the invention has been practiced:

EXAMPLE 1

Acrylamide-methacrylic acid emulsion recipe

|  | Grams |
|---|---|
| ISOPAR M | 27.6 |
| Sorbitan Monostearate | 1.65 |
| Water | 40.20 |
| Acrylamide | 34.51 |
| Methacrylic Acid | 2.31 |
| Sodium Hydroxide | 2.29 |
| 2,2'-azobis(isobutyronitrile) | 0.07 |

The sorbitan monostearate was dissolved in the ISOPAR M and the resulting solution was poured into a two liter glass reactor fitted with a stirrer, thermometer, and nitrogen purge. The monomer solution was prepared by dissolving the acrylamide and methacrylic acid in water. The pH of the monomer solution was adjusted to 8.5 with sodium hydroxide. The monomer solution was added to the organic phase with rapid agitation. The reactor was purged for 30 minutes after which time the 2,2'-azobis(isobutyronitrile) dissolved in acetone was added to the mixture. The emulsion was heated to 60° C. with agitation. The reaction proceeded for 2½ hours at which time it has reached completion. The resulting product was a stable emulsion which was inverted in water by the use of a surfactant. The resulting polymer solution gave a viscosity of 150 c.p.s. on a 1% solution.

EXAMPLE 2

Acrylamide-acrylic acid emulsion recipe

|  | Grams |
|---|---|
| ISOPAR M | 28.10 |
| Sorbitan Monostearate | 1.85 |
| Water | 40.00 |
| Acrylamide | 33.90 |
| Acrylic Acid | 2.40 |
| Sodium Hydroxide | 2.30 |
| 2,2'-azobis(isobutyronitrile) | 0.07 |

As in Example 1, the sorbitan monostearate was dissolved in the ISOPAR M and the resulting solution was poured into a two liter glass reactor fitted with a stirrer, thermometer, and nitrogen purge. The monomer solution was prepared by dissolving the acrylamide and acrylic acid in water. The pH of the monomer solution was adjusted to 8.5 with sodium hydroxide. The monomer solution was added to the organic phase with rapid agitation. The reactor was purged for 30 minutes after which time the 2,2'-azobis(isobutyronitrile) dissolved in acetone was added to the mixture. The emulsion was heated to 60° C. with agitation. The reaction proceeded for 2½ hours at which time it had reached completion. The resulting product was a stable emulsion which was inverted in water by use of a surfactant. The resulting polymer solution gave a viscosity of 225 cps. on a 1% solution.

EXAMPLE 3

Dimethylaminoethyl methacrylate emulsion recipe

|  | Grams |
|---|---|
| ISOPAR M | 27.60 |
| Sorbitan Monostearate | 1.65 |
| Water | 40.20 |
| Dimethylaminoethyl methacrylate (DMAEM) | 38.82 |
| Sodium Hydroxide | 2.29 |
| 2,2'-azobis(isobutyronitrile) | 0.07 |

The sorbitan monostearate was dissolved in the ISOPAR M and the resulting solution was poured into a two liter glass reactor fitted with a stirrer, thermometer, and nitrogen purge. The monomer solution was prepared by dissolving the DMAEM in water. The pH in monomer solution was adjusted to 8.3 with sodium hydroxide. The monomer solution was added to the organic phase with rapid agitation. The reactor was purged for 30 minutes after which time the 2,2'-azobis(isobutyronitrile) dissolved in acetone was added to the mixture. The emulsion was heated to 60° C. with agitation. The reaction proceeded for 5 hours at which time it had reached completion. The resulting product was a stable emulsion which was inverted in water by the use of a surfactant.

EXAMPLE 4

Polystyrene sulfonate emulsion recipe

|  | Grams |
|---|---|
| ISOPAR M | 27.60 |
| Sorbitan Monostearate | 1.65 |
| Water | 40.20 |
| Styrene Sulfonate | 36.80 |
| Sodium Hydroxide | 2.29 |
| 2,2'azobis(isobutyronitrile) | 0.07 |

This reaction was performed using the identical procedure as in the previous examples. The reaction proceeded for 8 hours at which time it had reached completion. The resulting product yielded a stable emulsion which was inverted in water by use of a surfactant.

We claim:
1. A stable water-in-oil emulsion containing a dispersion therein of finely-divided particles of water-soluble vinyl addition polymer, having a molecular weight of at least 1,000,000, said emulsion being characterized as having the ability to maintain a dispersion throughout said emulsion for a period of at least three weeks at which time said dispersion can be reformed with slight agitation, said emulsion comprising:
  A. an aqueous phase ranging between 75 and 95% by weight of the emulsion which is comprised of:
    (1) a water-soluble vinyl addition polymer having a concentration between 20 and 50% by weight of the emulsion, said polymer having a particle size within the range of 2 millimicrons to 5 microns,
    (2) water ranging between 45 and 55% by weight of the emulsion;

B. a liquid hydrocarbon ranging between 5 and 25% by weight of the emulsion; and additionally C. a water-in-oil emulsifying agent disposed between said aqueous phase and said liquid hydrocarbon and having a concentration between 0.1 and 15% by weight of the emulsion, wherein:
   (1) said water-in-oil emulsion is prepared by using as a reaction mixture:
      (a) water which contains dissolved therein a water-soluble vinyl addition monomer thereby producing a monomer phase having a concentration of from 75 to 95% by weight of the emulsion;
      (b) a liquid hydrocarbon ranging between 5 and 25% by weight of the emulsion;
      (c) water-in-oil emulsifying agent in a concentration of 0.1 to 15%; and
      (d) a free radical initiator whereby a water-in-oil emulsion is formed; and
   (2) heating said emulsion under free radical conditions to polymerize the water-soluble vinyl addition monomer containing emulsion thereby producing a stable water-in-oil emulsion which contains dispersed therein finely divided particles of a water-soluble vinyl addition polymer.

2. The stable water-in-oil emulsion of Claim 1 wherein the water-soluble vinyl addition polymer has a concentration between 25 and 40% by weight of the emulsion.

3. The stable water-in-oil emulsion of Claim 1 wherein the water-soluble vinyl addition polymer is from the group consisting of acrylamide polymers and water-soluble salts of polyacrylic acid.

4. The stable water-in-oil emulsion of Claim 1 wherein said water-soluble vinyl addition polymer is a water-soluble salt of polyacrylic acid.

5. The stable water-in-oil emulsion of Claim 3 wherein said water-soluble vinyl addition polymer is a copolymer of acrylamide and acrylic acid.

6. The stable water-in-oil emulsion of Claim 3 wherein said water-soluble vinyl addition polymer is a copolymer of acrylamide and methacrylic acid.

7. The stable water-in-oil emulsion of Claim 1 wherein the liquid hydrocarbon is a liquid aliphatic hydrocarbon.

8. The method of Claim 3 wherein the liquid hydrocarbon is a liquid aliphatic hydrocarbon.

9. A stable water-in-oil emulsion containing a dispersion therein of finely divided particles of water-soluble vinyl addition polymer, having a molecular weight of at least 1,000,000, said emulsion being chaacterized as having the ability to maintain a dispersion throughout said emulsion for a period of at least three weeks at which time said dispersion can be reformed with slight agitation, said emulsion comprising:

A. an aqueous phase ranging between 75 and 95% by weight of the emulsion which is comprised of:
   (1) a water-soluble vinyl addition polymer having a concentration between 20 and 50% by weight of the emulsion, said polymer having a particle size within the range of 2 millimicrons to 5 microns,
   (2) water ranging between 45 and 55% by weight of the emulsion;

B. a liquid aliphatic hydrocarbon ranging between 5 and 25% by weight of the emulsion; and additionally C. a water-in-oil emulsifying agent disposed between said aqueous phase and said liquid hydrocarbon and having a concentration between 0.1 and 15% by weight of the emulsion, wherein:
   (1) said water-in-oil emulsion is prepared by using as a reaction mixture:
      (a) water which contains dissolved therein a water-soluble vinyl addition monomer thereby producing a monomer phase, having a concentration of from 75 to 95% by weight of the emulsion;
      (b) a liquid aliphatic hydrocarbon ranging between 5 and 25% by weight of the emulsion;
      (c) water-in-oil emulsifying agent in a concentration of 0.1 to 15%; and
      (d) a free radical initiator whereby a water-in-oil emulsion is formed; and
   (2) heating said emulsion under free radical conditions to polymerize the water-soluble vinyl addition monomer containing emulsion thereby producing a stable water-in-oil emulsion which contains dispersed therein finely divided particles of a water-soluble vinyl addition polymer.

10. The stable water-in-oil emulsion of Claim 9 wherein the water-soluble vinyl addition polymer has a concentration between 25 and 40% by weight of the emulsion.

11. The stable water-in-oil emulsion of Claim 9 wherein the water-soluble vinyl addition polymer is from the group consisting of acrylamide polymers and water-soluble salts of polyacrylic acid.

12. The stable water-in-oil emulsion of Claim 9 wherein said water-soluble vinyl addition polymer is a water-soluble salt of polyacrylic acid.

13. The stable water-in-oil emulsion of Claim 9 wherein said water-soluble vinyl addition polymer is a copolymer of acrylamide and acrylic acid.

14. The stable water-in-oil emulsion of Claim 9 wherein said water-soluble vinyl addition polymer is a copolymer of acrylamide and methacrylic acid.

References Cited

UNITED STATES PATENTS

| | | |
|---|---|---|
| 3,041,318 | 6/1962 | Hess. |
| 3,284,393 | 11/1966 | Vanderhoff et al. |
| 3,624,019 | 11/1971 | Anderson et al. |

FOREIGN PATENTS

| | | |
|---|---|---|
| 51,095 | 7/1968 | Romania. |
| 1,516,426 | 1/1968 | France. |

MELVIN GOLDSTEIN, Primary Examiner

U.S. Cl. X.R.

260—29.6 WQ